Aug. 7, 1951 M. C. MEYER ET AL 2,562,932
BEAD MACHINE
Filed Aug. 11, 1948 4 Sheets-Sheet 3
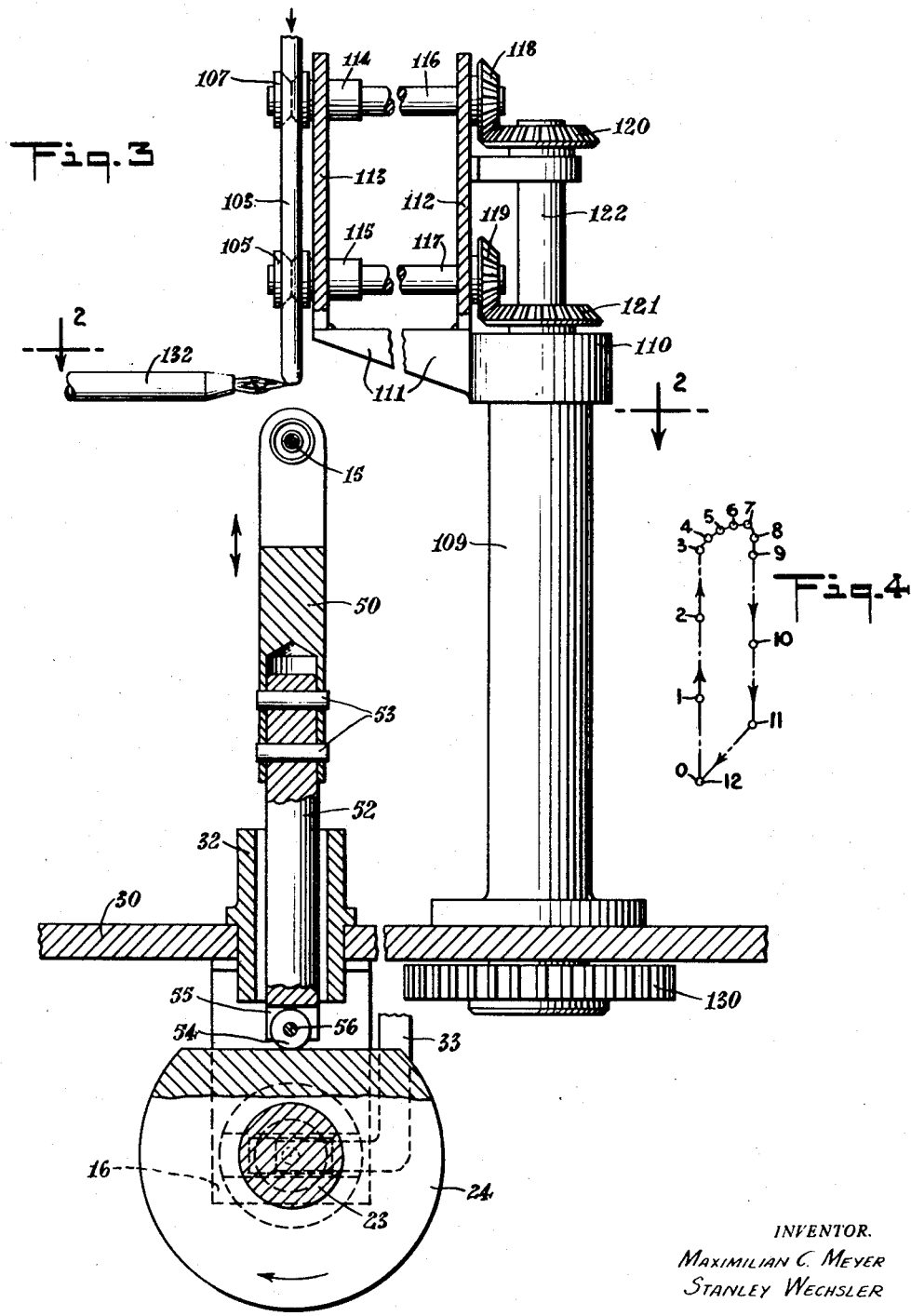
INVENTOR.
MAXIMILIAN C. MEYER
STANLEY WECHSLER
BY Greene & Durr
ATTORNEYS

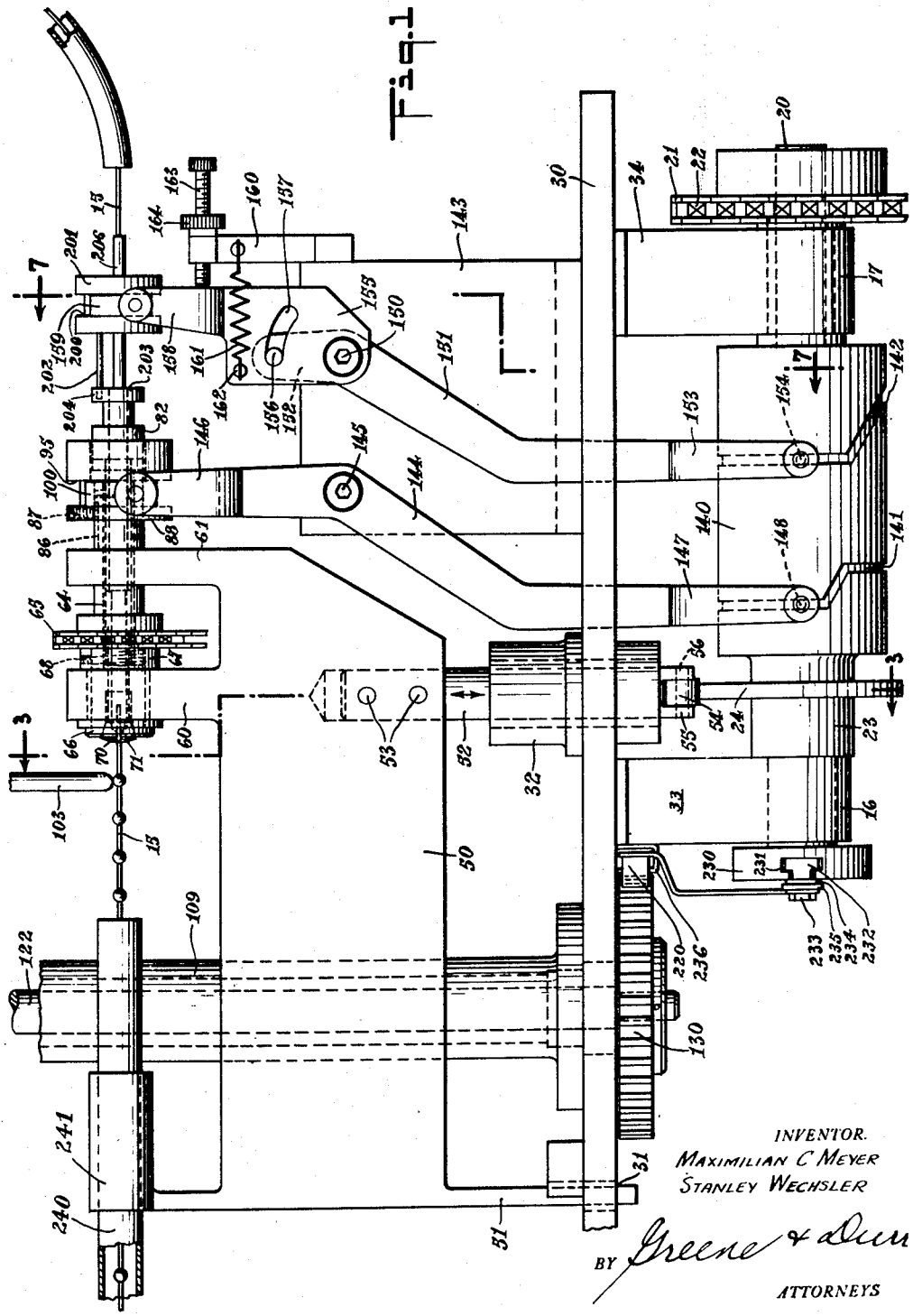

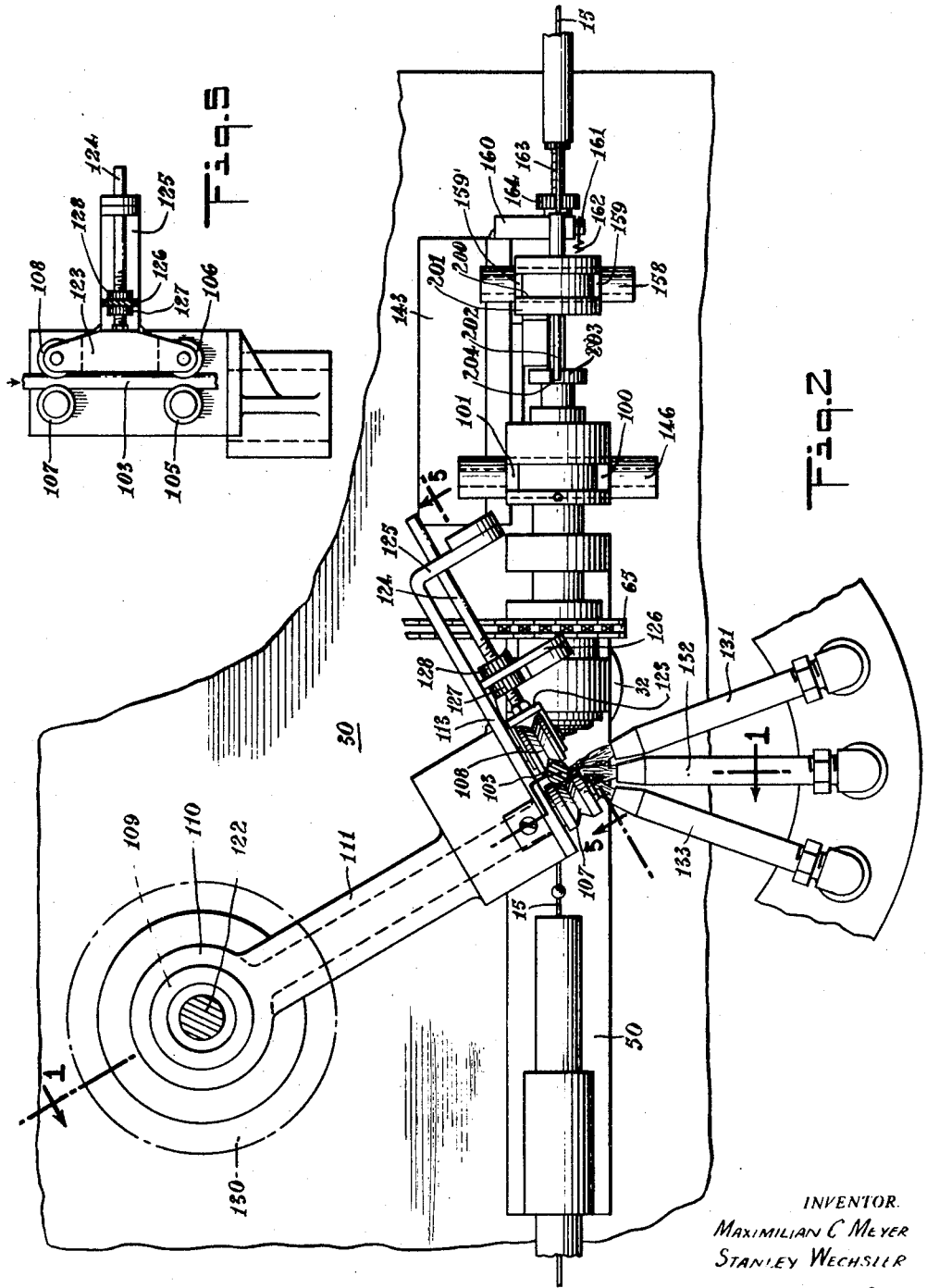

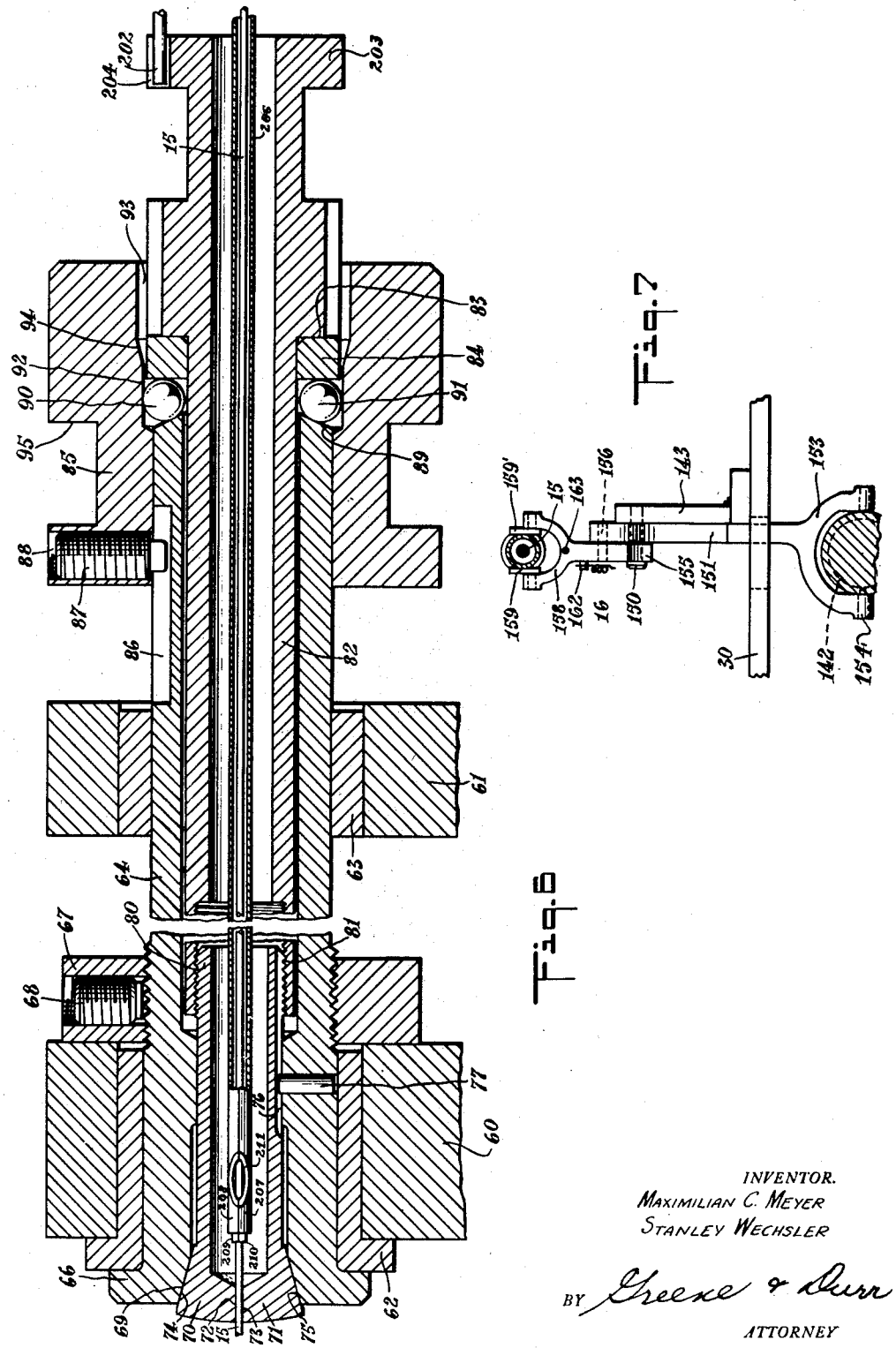

Patented Aug. 7, 1951

2,562,932

UNITED STATES PATENT OFFICE 2,562,932

BEAD MACHINE

Maximilian C. Meyer and Stanley Wechsler, Brooklyn, N. Y.; said Wechsler assignor to said Meyer Application August 11, 1948, Serial No. 43,568

2 Claims. (Cl. 49—7)

1

This invention relates to a machine for making beads from congealable or hardenable liquid material; more particularly it relates to a machine for automatically depositing a series of globules of molten material suitable for the formation of beads onto a wire.

An object of this invention is to provide a machine for automatically depositing a series of globules of congealable liquid material onto a wire.

Another object of the invention is to provide a machine for forming beads from molten material in which the beads are substantially spherical.

Another object of the invention is to provide a machine for forming a series of beads on a wire which are substantially uniform in size.

Another object of the invention is to provide a machine for depositing a series of globules of molten material on a wire in which the globules are of substantially uniform size, which size, however, can be predetermined.

These and other objects ancillary thereto are obtained by providing a machine which rotates a wire about its axis while intermittently moving the wire through a globule of a viscous mass of bead forming material, for example, molten glass. Preferably the wire is moved upwardly into the globule, is caused to dwell in the globule of bead forming material momentarily and is then moved vertically away from the viscous gob of bead forming material. The wire is caused to dwell for a short time in the molten gob so as to pick up a globule of the viscous mass. The rotation of the wire about its axis causes the deposited material thereon to distribute itself about and harden into a spherical ball substantially uniformly distributed about the axis of the wire. After the wire is moved away from the viscous gob it is then moved forward axially so that on the next upward movement of the wire, a different part of the wire is moved into the viscous gob.

The material which is employed for forming the beads may be any thermoplastic material such as glass, thermoplastic resinous material or metals. Examples of resinous materials are the acrylic resins such as methyl methacrylate; the thermoplastic polyamide compounds; phenol formaldehyde resins in their thermoplastic state; alkyd resins; vinyl resins such as polystyrene, polyvinyl chloride, polyvinyl acetate, etc., and copolymers of these materials; thermoplastic cellulose derivatives such as cellulose acetate, cellulose acetate butyrate, ethyl cellulose, etc.; polyvinylidene chloride polymers, etc.

The bead material may also be a thick viscous solution of a resin or cellulose derivative in a rela-

2 tively small amount of solvent, so that the bead is hardened when the solvent evaporates.

Thermosetting resins such as phenol aldehyde, urea aldehyde, melamine aldehyde and alkyd resins may also be employed and after the resin is deposited on the wire in its thermoplastic or its dissolved state, the bead can then be hardened in a curing chamber.

The wire or core material employed may be of copper, bronze, steel, or other metal or alloy and it preferably has a round cross-section but it can have a polygonal cross-section to produce bead holes of different shapes. Preferably the wire has about the same temperature coefficient of expansion as the bead forming material and it is also soluble in acids or similar liquids so that the wire can be removed from the beads by dissolving.

The novel features characteristic of this invention are set forth with particularity in the appended claims. The invention itself, however, as to its organization, together with additional objects and advantages thereof, will best be understood from the following description of specific embodiments when read in connection with the accompanying drawings in which:

Figure 1 is a side view of the machine of the invention.

Figure 2 is a top plan view of the machine taken along line 2—2 of Figure 3.

Figure 3 is a view of the machine taken along line 3—3 of Figure 1.

Figure 4 is a detail view illustrating the various positions of the wire at equally spaced periods of time in its movement.

Figure 5 is a detail view showing the rod holding and feeding means.

Figure 6 is a detail view showing the wire holding forwarding and rotating means.

Figure 7 is a detail view of a part of the wire forwarding mechanism taken on line 7—7 of Figure 1.

The frame 50 and all the other essential structure of the machine is shown as supported from a stationary table 30. This table contains a slot 31 in which the leg 51 at the end of the frame 50 is adapted to slide. A sleeve 32 having an internal longitudinal bearing surface in which the shaft 52 is adapted to slide is attached to the table near the center part thereof. The shaft 52 is attached at one end to the frame 50 as shown at 53 and at its other end contains a cam which is shown as the roller 54 rotatably mounted in the U-shaped end 55 of the shaft 52 by means of the axle 56.

In order to make a machine which is entirely automatic and which is adapted to deposit spherical beads symmetrically upon a wire, it is necessary to give the wire a combination of motions, i. e., the wire must be rotated about its axis to cause the bead to be deposited symmetrically about the wire, the wire must be moved into and out of contact with a liquid gob of the bead forming material and the wire must be moved parallel to the axis periodically to present the next position upon which to deposit the bead forming material.

Attached to the underside of the table 30, are two bearing containing elements 33 and 34, supporting the bearings 16 and 17. A shaft 20, rotatable in the bearings 16 and 17 contains the various control means, i. e. (1) the means for moving the frame 50 into line with the bead forming globule, (2) the means for moving the wire parallel to its axis when the wire is remote from the supply of bead forming material, and (3) the means for feeding the bead forming material as it is used up into the path of the wire.

The shaft 20 is rotated by any suitable driving means such as by the chain 21 and sprocket wheel 22. Attached to the shaft is a collar 23 containing a cam wheel 24. As the shaft 20 is rotated, the surface of the cam wheel 24 presses against the cam following roller 54 forcing the frame 50 upwardly and permitting the return of the frame 50 to its lowermost position. A spring may be attached between the frame 50 and the table 30 to assure that the cam follower 54 is pressed against the surface of the cam 24 at all times.

An idea of the type of movement desired in the frame may be obtained from Figure 4. This figure shows the position of the wire 15 held by the frame 50 at successive units of time in one complete cycle. The entire cycle for one size of bead, for example, may be about two seconds. The time required for the frame 50 and wire 15 then to travel between any two consecutive members (from 0–12 in Figure 4) would be approximately a sixth of a second. The upward and downward movements of the wire have been separated laterally in Figure 4 to avoid confusion. Although the wire moves upward and downward substantially vertically in the machine shown this exact line of movement is not esential. The essential requirements are that the wire be moved quickly into the gob of bead forming material, be permitted to dwell in the gob for a relatively long part of the cycle and then be quickly removed. As shown in Figure 4 the wire from position 3 to position 9 or about ½ of the entire cycle is adjacent to or within the gob of bead forming material.

The means which provides for the movement of the wire 15 into and out of the plastic or liquid bead forming material and the proper dwell of the wire while in contact with the gob of liquid is a most important feature of the present invention. For example, with this part of the apparatus alone it is possible for an unskilled workman to make beads as the other required movements of the wire can be done by the hand of an unskilled operator. Thus, in order to make beads by an apparatus which contains only the means for moving the frame 50 into and out of the gob of bead forming materials, it is necessary for the operator to push the wire forward after or during each downward movement, to rotate the wire and to adjust the rod or other means for supplying the liquid globule of bead forming material.

It is preferred however to make the machine substantially completely automatic and to that end to provide means for continuously rotating the wire 15 on which the beads are to be deposited, means for moving the wire longitudinally of its axis as the beads are deposited thereon, and means for feeding the bead forming gob of material so that the wire in its upward movement moves into the said gob or globule.

*Means for holding and rotating the wire*

The means for holding and rotating the wire are best shown in Figures 1 and 6. Extending upwardly from the right hand side of the frame 50 as shown in Figure 1 are the two brackets 60 and 61 containing bearing surfaces 62 and 63 (see Figure 6). Tubular member 64 is rotatably mounted in the bearings 62 and 63 and is adapted to be rotated by some suitable means such as the chain and sprocket wheel device 65 (see Figure 1, omitted from Figure 6). The forward end of the tubular member 64 is flanged as shown at 66 and this flanged end 66 is held against the outer edge of bearing surface 62 by the nut 67 which is locked in place on the threaded portion of the member 64 by the lock screw 68. The opening at the center portion of the flanged end 66 of the tubular member 64 is flared outwardly as shown at 69 (see Figure 6). Slidable within the orifice extending through the member 64 are two complementary wire holding grippers 70 and 71. These grippers are slotted at 72, 73 so that when they are held together they substantially surround the wire 15. Normally however the gripping members 70 and 71 tend to separate at the ends to release the wire 15. The outer edge portions of the gripper elements 70 and 71 are flanged as shown at 74 and 75 so that when they are pulled to the right as shown in Figure 6 they are forced together to tightly grip the wire between them. Although two gripping members are sufficient, it is obvious that three or more such members can be employed and that the three or more members will operate in substantially the same way as the two complementary members 70 and 71. One or both of the gripping members 70, 71 contains a slot 76 therein into which the key 77 from the tubular member 64 is adapted to extend so that the gripping members are forced to rotate with the tubular member 64.

The gripping members 70 and 71 are united at the rear end 80 and contain exterior threads 81 to which is attached the other tubular member 82 which extends through and beyond the end of the tubular member 64. Adjacent the end of member 82 is a shoulder 83 to which is attached a bearing surface 84. Surrounding the right hand end (as shown in Figure 6) of tubular member 64 is a sleeve member 85 which is keyed in the slot 86 of the tubular member 64 by means of the screw controlled key 87 in the threaded opening 88.

The end of the tubular member 64 slopes away from the center as shown at 89. Between the sloping end 89 of member 64 and the flange surface 84 of the holding tube 82 a number of steel balls 90, 91 are located. These balls are held in place by the annular opening 92 in the right hand end of the sleeve 85. The annular opening 92, the diameter of the steel balls 90, 91 and the length and supports for the tubular member 64 are adjusted so that in the position shown in Figure 6, the sloped surface 69 at the flanged end 66 of tubular member 64 holds the gripper members 70, 71 tightly about the wire 15. The annular opening 92, however, increases in size at 94 and connects with the enlarged annular opening 93. The member 85 also contains the annular groove 95 on the outside thereof. If the member 85 is pushed foreward by a cam which fits in groove 95 the balls 90, 91 will be permitted to move upwardly and to the left (in Figure 6) along the slope 89 of tubular member 82. This movement of the balls 90, 91 upwardly and to the left permits the tubular holding member 82 and the attached gripping members 70, 71 to move to the left thus releasing the grip on the wire 15 so that the wire is ready to be moved foreward to its next bead forming position. The sleeve 85 is moved by the cams 100, 101 which fit into the annular groove 95 and are moved transversely by means presently to be described.

Wire forewarding means

The means for moving the wire foreward in the direction of its axis operates during the interval that the carriage 50 and wire is in its lowermost position away from the supply of bead forming material. As the carriage 50 and wire 15 move downwardly from the rod 103, the gripper means 70, 71 for holding and rotating the wire are caused to release their grip on the wire by movement of the sleeve 85 to the left (in Figures 1 and 6). The movement of the sleeve 85 is caused by the cams 100, 101 which slide in the annular groove 95 and are held in yoke 146 which, in turn, is periodically moved to the left and returned by mechanism to be described later.

When the hold of the gripper members 70, 71 on the wire 15 is released the wire forewarding means begins to operate immediately. The wire forewarding means is operated by a yoke 158 similar to yoke 146. The yoke 158 contains two cams 159 and 159', one at each side thereof which slide in an annular groove 200 of a second sleeve member 201. (The cams 159 and 159' of yoke 158 as well as the cams 100 and 101 of the yoke 146 are long and rectangular in cross section so that they always remain in the sides of the respective grooves 200 and 95 regardless of whether or not the frame 50 is in its uppermost or lowermost position.) Attached to the side of sleeve 201 is a laterally extending rod 202 which is adapted to slide in a slot 204 contained in a flanged end 203 of the tubular member 82 so that rotation of the member 82 will impart rotation to the sleeve member 201 and at the same time permit longitudinal movement of the sleeve 201 with respect to the member 82. Also attached to the sleeve 201 is the tube 206 which extends from a point to the right of sleeve 201, almost up to inside edge of the slots 72, 73 of grippers 70, 71. The inner (or left hand) end of tube 206 as shown in Figure 6, is split into two portions 207 and 208 and the orifice is reduced at the ends 209, 210 so as to hold the wire with a spring grip. The tube has cut out portions as shown at 211 to increase the spring action of the split ends 207 and 208. The grip which the split ends 207 and 208 applies to the wire 15 is sufficient to move it forward when the grip of the jaws 70, 71 is released. Therefore the sleeve 201 is adapted to be moved to the left by the yoke 158 when the cams 100, 101 have released the grip of the elements 70, 71 on the wire 15 and the sleeve 201 is then moved back to position for the next movement of the wire only after the gripper elements 70, 71 have again been moved to hold the wire in its foreward position so that on the return movement of sleeve 201 the split ends 207 and 208 slide back over the wire 15.

Rod feeding means

The structure provided for moving the rod 103, the tip of which is melted or otherwise plasticized so that the molten tip is always at the apex of the path of the wire 15 as this latter is moved by the carriage 50, is shown in Figures 2, 3 and 5. The rod is held in a substantially vertical position and moved in the direction of its axis by means of two pair of grooved rollers or pulleys 105, 106 and 107, 108 (105 and 107 being positively rotated and 106 and 108 being idler rollers). The table 30 holds a hollow upright standard or support 109 to which is bracketed a collar 110, an extending portion 111 of which contains two upright members 112 and 113. Member 113 carries two bearings 114 and 115, through which the shafts 116 and 117 carrying the pulleys 107 and 105, respectively, pass. The ends of shafts 116 and 117 opposite the ends containing pulleys 107 and 105 contain conical gears 118 and 119. The gears 118 and 119 and thus the pulleys 107 and 105 are driven synchronously by means of the conical gears 120, 121 fixed to the shaft 122 which extends upwardly through the hollow standard 109.

The pulleys 106 and 108 are adjustably located a fixed distance from the corresponding pulleys 105 and 107 so that they can be made to hold different sizes of rod material. As shown in Figures 2 and 5 these pulleys 106 and 108 are held in a bracket 123 which in turn is attached to a bolt 124 which passes through brackets 125 and 126 which extend from the member 113. Setting nuts 127 and 128 are provided on either side of bracket 126 to hold the bolt 124 in the desired position.

The shaft 122 is given an intermittant motion by means of a ratchet means 220 which rotates the gear 130 which is attached to the shaft 122 so as to rotate shaft 122 when moved in one direction but not when moved in the other direction. Where the bead forming material is deposited in its molten state, means must be provided for heating the tip of the rod or other bead forming material. Such a means is shown in Figure 2 where a series of three gas jets from burners 131, 132, and 133 are directed against the tip of the rod 103. Where the bead forming material is already in a plastic condition the rod 103 may be replaced by a hollow tube through which the plastic bead forming material is fed.

Driving means for the apparatus

As heretofore stated the means for rotating the wire 15 is driven by means of the chain and sprocket wheel 65. The remainder of the moving parts however are preferably driven from the main driving shaft 20 shown in the lower part of Figure 1. The cam 24 for moving the carriage 50 has already been described. The shaft 17 also has attached thereto a cylinder 140 containing two cam grooves 141 and 142.

Fixed to the table 30 is another bracket 143. At the foreward or left hand end (as shown in Figure 1) of bracket 143 the lever 144 is pivoted as shown at 145. This lever includes the yoke 146 at its upper end and a yoke 147 at its lower end. The lever can be pivoted about the point 145 as the lower end is slidable in a slot formed in the table 30. The yoke 146 contains cams 100 and 101 which operate the wire gripping means. The yoke 147 contains one cam follower 148 which is slidable in the cam groove 141 and which operates to pivot the lever back and forth about the fulcrum 145.

Pivoted at 150 on bracket 143 is a second lever having a lower arm 151 and an upper arm 152. The lower arm 151 contains a yoke 153 having a cam follower 154 similar to the cam follower 148 but operating in groove 142 of cylinder 140. This lever device is shown in detail in Figure 7. The lever 151, 152 operates the wire forewarding means by moving the yoke containing arm 155. The arm 152 has a pin 156 integral therewith which extends through a slot 157 in arm 155. The arm 155 is also pivotally attached to the bracket 143 at 150. The yoke 158 of arm 155 contains cam surfaces 159 and 159' at either side thereof (similar to yoke 146). The projection 160 on bracket 143 holds one end of a spring 161 the other end of which is attached at 162 to the arm 155 so as to pull the arm 155 back to its rearward position (or to the right as shown in Figure 1). The pin 156 operated by the lever 151 serves to push the arm 155 foreward against the action of the spring 161. The amount of the rearward motion of the arm 155 however is made adjustable by the set screw 163 held in place in the projection 160 by the nut 164. The length of the stroke of the arm 155 is therefore adjustable by limiting the amount of its return movement so that the space between the beads on the wire 15 can be adjusted.

The movement of the bead forming rod 103 is regulated and synchronized with the remainder of the operating parts by driving the racket wheel 130 from the main driving shaft 20. At the end of the main drive shaft 20 is the rotor element 230 containing a dove-tail like slot extending all the way across the same. Adapted to slidably fit into this slot is the dove tail insert 232, the end of which extends outwardly through a hole in the angled arm 33 and is held by nut 233. Washers 234 and 235 hold the arm 33 away from the rotor 230. The nut 233 is adapted to hold the dove-tail insert 232 in any position in the slot 231 so as to adjust the length of the oscillation of the arm 33 on the rotation of the shaft 20. Attached to the upper end of the arm 33 is the racket bar 220. The racket bar 220 is held in place against the racket wheel 130 by the bracket 236. The racket bar 220 therefore moves back and forth a predetermined distance with each rotation of the shaft 20 and accordingly each time a bead is formed on the wire 15. The distance of the back and forth movement is determined by the distance the dovetail insert 232 is held away from the axis of the shaft 20.

Operation

The machine is operated as follows. A length of wire which is convenient to handle and long enough to hold a substantial number of beads (for example about 100–200) is introduced into the tube 206 and pressed past the ends 209, 210 of the split spring pressed ends 207, 208 thereof. The two chain driving mechanism 21 and 65 are put in motion and the wire is automatically fed through the gripping members 70, 71. As the wire 15 passes to a position beneath the glass rod 103, the position of the said glass rod 103 and the burners 131, 132, 133 are adjusted. The apparatus then continues to operate automatically. Each time the carriage 50 is moved upwardly, the rotating wire 15 contacts the drop of molten glass on the end of the glass rod 103. As the wire 15 is moved away from the rod 103, a blob adheres to the wire and takes a spherical form about the wire. On the movement of the carriage downward the cam groove 141 of cylinder 140 first causes the sleeve 85 to move to the left to release the grip of the jaws 70, 71 and shortly thereafter the cam groove 142 of cylinder 140 causes the wire to be moved foreward by the tube 206 with the spring pressed holders 207, 208 through the opened grippers or jaws 70, 71. The grippers 70, 71 then tighten about the wire and the tube 206 is returned to the position shown in Figure 1. After passing the bead forming zone the wire may be passed into a tubular chamber 240 held by the tube 241 attached to the carriage 50. The beads may be given an annealing or a heat treatment while in the chamber 240.

The size of the bead formed depends on several factors among which are, (1) the nature, size and fluidity of bead forming material, (2) the speed of rotation of the wire, (3) the speed of rotation of the drive pulley 56 or in other words the time that frame 50 requires for one cycle, (4) the nature and size of the wire, (5) the time of dwell of the wire in the liquid bead-forming material which depends partly on the shape of the cam 24 and partly on the rate of glass feed. Drive pulleys 21 and 65 may, therefore, be driven independently although, if desired, the speeds thereof may be synchronized.

After the beads have been hardened on the wire, they are then removed therefrom by drawing the wire so that the beads can be slipped off or by dissolving the wire and a substantially spherical bead with a hole through an axis thereof is obtained. The machine is capable of producing well-formed beads of uniform diameter without employing skilled operators.

Although certain specific embodiments of this invention have been shown and described, it will be understood that many modifications thereof are possible. This invention, therefore, is not to be restricted except insofar as is necessitated by the prior art and by the spirit of the appended claims.

We claim:

1. In a machine for depositing a plurality of spaced beads of viscous hardenable liquid material upon a wire the improved construction which comprises a stationary base, a carriage slidably mounted on said base for movement toward and away from said base, means at one side of said carriage adapted to grip and rotate a wire, means at the other side of said carriage adapted to support the wire with an open area between said two sides of the carriage, means for supplying a liquid gob of viscous hardenable material to the wire held between the two sides of said carriage when said carriage is at its furthermost point away from said base, cam means for moving the carriage toward and away from said base, means for positively feeding the viscous hardenable material as it is removed by the wire, and means for simultaneously driving said cam means and said means for feeding the viscous hardenable material whereby the wire is always moved by said carriage directly into the central portion of said liquid gob.

2. In a machine for depositing a plurality of spaced beads of viscous hardenable liquid material upon a wire the improved construction which comprises a stationary base, a carriage slidably mounted on said base for movement toward and away from said base, means at one side of said carriage adapted to grip and rotate a wire, means at the other side of said carriage adapted to support the wire with an open area between said two sides of the carriage, means for holding a glass rod so that the end thereof is approximately at the point where the portion of the wire extending between the two sides of the carriage passes when said carriage is at its furthermost point away from said base, substantially stationary means for melting the said end of the glass rod, cam means for moving the carriage toward and away from said base, means for positively feeding the glass rod as the glass is removed from the end thereof by said wire and means for simultaneously driving said cam means and said means for feeding the glass rod whereby the wire is always moved by said carriage directly into the central portion of melted end of the glass rod.

MAXIMILIAN C. MEYER.
STANLEY WECHSLER.

REFERENCES CITED

The following references are of record in the file of this patent:

UNITED STATES PATENTS

| Number | Name | Date |
|---|---|---|
| 2,348,035 | Synek | May 2, 1944 |

FOREIGN PATENTS

| Number | Country | Date |
|---|---|---|
| 624,239 | France | July 11, 1927 |